Feb. 19, 1952
H. D. BROTMAN
2,586,508
STRAINER FOR WASHING MACHINES
Original Filed Jan. 18, 1945
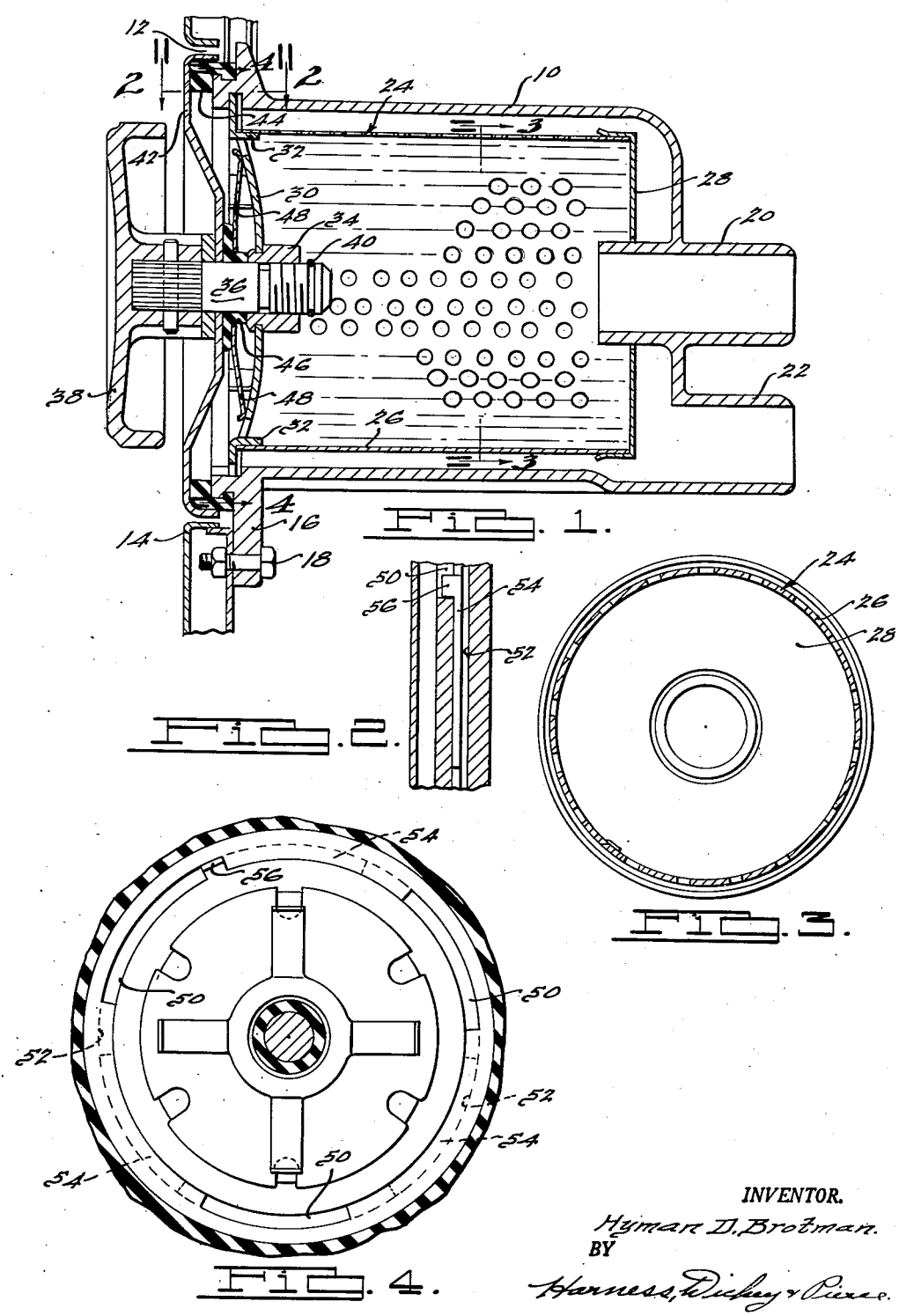
INVENTOR.
Hyman D. Brotman.
BY
Harness, Dickey & Pierce.
ATTORNEYS.

Patented Feb. 19, 1952

2,586,508

UNITED STATES PATENT OFFICE 2,586,508

STRAINER FOR WASHING MACHINES

Hyman D. Brotman, Detroit, Mich., assignor, by mesne assignments, to Horton Manufacturing Company, Fort Wayne, Ind., a corporation of Indiana Original application January 18, 1945, Serial No. 573,362. Divided and this application March 29, 1946, Serial No. 658,286

6 Claims. (Cl. 210—164)

The present invention relates to strainers of the type employed to mechanically separate foreign material physically carried by water or other fluids.

The present application constitutes a division of my copending application for patent, Serial No. 573,362, filed January 18, 1945, and entitled Automatic Washing Machine, now abandoned.

The principal objects of the present invention are to provide strainers of the above generally indicated type which are simple in arrangement, economical of manufacture and assembly, and which are reliable and efficient in operation; to provide an improved strainer in which the foreign matter accumulated in the strainer may be quickly and easily removed; to provide, in a strainer having a casing and a straining element, an improved means for mounting said straining element in said casing; to provide, in a strainer of the above generally indicated type, improved means preventing escape of fluid from said strainer; and to generally improve the construction and operation of strainers of the above generally indicated type.

With the above as well as other objects in view, which appear in the following description and in the appended claims, a preferred but illustrative embodiment of the invention is shown in the accompanying drawing throughout the several views of which corresponding reference characters are used to designate corresponding parts, and wherein:

Figure 1 is a view in longitudinal section of a strainer embodying the present invention;

Figure 2 is a view in horizontal section taken along the line 2—2 of Fig. 1;

Figure 3 is a view in transverse section taken along the line 3—3 of Fig. 1; and Figure 4 is a view in transverse section taken along the line 4—4 of Figure 1.

It will be appreciated from a complete understanding of the present invention, that the improvements thereof may be embodied in strainers of widely differing types and sizes and designed for numerous different applications. In an illustrative but not in a limiting sense, the present improvements are herein disclosed as being embodied in a strainer which, by way of example, is well adapted for use in automatic washing machines, an example of which is disclosed and claimed in applicant's copending application Serial No. 573,362, filed January 18, 1945. Strainers are employed on machines of this type on the intake side of the pump which discharges the rinse water or wash water in order to prevent fouling of the pump by the dirt, pieces of cloth, or lint which is carried away by the water.

Referring to the drawing, the strainer comprises a generally cylindrical shaped casing 10 having one end thereof open and coinciding with an opening 12 in a wall 14 of a washing machine. Casing 10 is provided with a plurality of outwardly extending ears 16 adapted to receive bolts 18 whereby the casing is secured to the wall 14. At its opposite end casing 10 is provided with two tubular elements 20 and 22 serving as inlet and outlet connections respectively for the fluid to be strained. The straining cylinder 24 having a perforated side wall 26 is disposed within the casing 10 and provided with a removable inner end wall 28 having a central opening through which the tubular element 20 projects. At its opposite end the straining cylinder 24 is closed by a disk 30 having struck-out tabs 32 arranged in a circle and so fitting the inner surface of the straining cylinder 24 that the parts are releasably held together by friction.

The disk 30 has a threaded bushing 34 at its center, into which a stem 36 on a hand wheel 38 is threaded and releasably locked in place by a snap ring 40. A cover 42 is carried by the stem 36 and the outer margin of the cover engages a rubber sealing ring 44 anchored on the open end of the casing so as to prevent water leakage. Leakage of water around the stem 36 is prevented by a rubber bushing 46 which presses against a four-finger spring element 48 having its fingers contacting the disk 30.

For locking the parts in the casing 10, the latter is provided with circumferentially spaced notches 50 on its inner periphery at the outer end as shown by Figs. 2 and 4, and the notches 50 communicate at one end with circumferentially extending grooves 52. The disk 30 at its outer margin has projections 54 adapted first to move into the notches 50 when the disk 30 is axially applied to the casing, and then upon turning of the disk 30, the projections 54 enter the grooves 52 so as to lock the disk 30 to the casing 10. A finger 56 on the disk 30 at one point limits the turning movement of the disk 30.

It is evident that if the hand wheel 38 is turned in a tightening manner, the seals 44 and 46 are compressed accordingly. When it is desired to remove the strainer for cleaning, the hand wheel 38 is turned to loosen it and after the cover 42 is loose on the rubber ring 44, it and the disk both will turn due to the central pressure applied by the four-fingered spring element 48, until the projection 56 reaches the other end of its notch 50. The projections 54 are now in releasing position and the assembly may then be removed and the straining cylinder 24 can then be separated from the inner end wall 28 and the disk 30 to facilitate cleaning it.

Although only one form of the invention has been illustrated and described in detail, it will be apparent to those skilled in the art that various modifications may be made without departing from the spirit of the invention and from the scope of the claims.

What is claimed is:

1. A strainer comprising a casing having inlet and outlet connections and an open end, a perforated straining cylinder disposed within said casing, a removable end wall mounted on the inner end of said cylinder, a disk extending transversely of said casing and removably mounted in the outer end of said cylinder, interlocking means on said disk and casing for removably securing said disk thereto, a hand wheel provided with a stem having its inner end threadably mounted in said disk, means preventing the removal of said hand wheel from said disk, a cover carried by said stem adapted to close said open end of said casing, and spring means engaging said disk and urging said cover against said hand wheel.

2. A strainer comprising a casing having inlet and outlet connections and an open end, a sealing ring mounted on said open end of said casing, a perforated straining cylinder disposed within said casing and having a removable inner end wall, a disk removably mounted in the outer end of said cylinder, cooperating means on said disk and said casing for securing said disk against movement longitudinally of said casing, said means comprising interfitting projections and grooved means formed on said disk and in said casing respectively, a hand wheel having a stem having its inner end threadably mounted in said disk, a cover adapted to engage said sealing ring to close said open end of said casing and having an aperture through which said stem projects, a second sealing ring carried by said stem and engaging said cover, and spring means engaging said disk and inducing friction effective when said cover is loosened to cause said disk to turn with said hand wheel upon rotation of said hand wheel.

3. A strainer comprising a casing having inlet and outlet connections and an open end, a straining cylinder having a removable end wall on its inner end and a disk removably mounted in its outer end, cooperating means on said disk and said casing adapted to permit insertion of said cylinder into said casing in one rotative position relative thereto and rotation of said disk relative to said casing to a second position, said means including means positively preventing continued rotation of said disk relative to said casing beyond said second position and means positively preventing movement of said disk longitudinally of said casing when in said second position, a cover adapted to close said open end of said casing, a hand wheel having a stem extending through said cover for rotation relative thereto and having its inner end threadedly mounted in said disk, and spring means engaging said disk and inducing friction effective when said cover is loosened to cause said disk to turn with said hand wheel.

4. A casing having inwardly extending peripherally spaced projections, a strainer having a perforated cylindrical wall portion, a closure for one end of said strainer, a disk closing the opposite end of said strainer and having a central threaded sleeve and peripherally spaced projections which interlock with the projections on the casing for retaining the strainer therewithin, a hand wheel having a threaded stem engaging the thread of the sleeve, means for locking the stem on said sleeve against removal, a cover on said stem between the hand wheel and disk, sealing means about said stem engaging said cover, and spring means disposed between said sealing means and said disk.

5. A casing having inlet and outlet ports and an open end provided with locking means, a strainer within said casing having on one end a disk provided with locking means for engaging said casing and for securing it therewithin, a threaded sleeve secured to said disk, a threaded stem in engagement with the thread in said sleeve, means for limiting the rotation of said stem in said sleeve for preventing separation thereof, a cover on said stem, a sealing element on said stem engaging said cover, and a spring between said element and said disk for forcing said element in sealing relation to said cover.

6. A strainer structure comprising a generally cylindrical casing open at one end and having a permanently fixed end wall at its other end provided with an outlet and provided with an axially located inlet having a tubular portion projecting inwardly of the casing, a perforated cylindrical strainer mounted within said casing and having an open end located at the open end of the casing and an end wall at its other end adjacent said end wall of the casing, and readily removable means for closing the open ends of said casing and strainer and for supporting the strainer within the casing, said end wall of the strainer having a central aperture fitting over said inwardly projecting tubular portion of the inlet.

HYMAN D. BROTMAN.

REFERENCES CITED

The following references are of record in the file of this patent:

UNITED STATES PATENTS

| Number | Name | Date |
|---|---|---|
| 1,115,784 | Cranwell et al. | Nov. 3, 1914 |
| 1,761,932 | Nutt | June 3, 1930 |
| 1,937,415 | Sidney | Nov. 28, 1933 |
| 1,941,311 | McLean | Dec. 26, 1933 |
| 2,047,793 | McKinley | July 14, 1936 |
| 2,081,968 | Wicks et al. | July 1, 1937 |
| 2,173,603 | Dodge | Sept. 19, 1939 |
| 2,201,790 | Rouch | May 21, 1940 |
| 2,471,069 | Le Clair | May 24, 1948 |